United States Patent
Beaudet et al.

(10) Patent No.: US 8,783,591 B2
(45) Date of Patent: Jul. 22, 2014

(54) METHOD OF PREPARING WOOD FIBERS FOR A CULTIVATION SUBSTRATE

(75) Inventors: Eric Beaudet, Savennieres (FR); Jerome Cowper, Moncrabeau (FR)

(73) Assignee: Florentaise, Saint-Mars-du-Desert (FR)

( * ) Notice: Subject to any disclaimer, the term of this patent is extended or adjusted under 35 U.S.C. 154(b) by 385 days.

(21) Appl. No.: 13/330,121

(22) Filed: Dec. 19, 2011

(65) Prior Publication Data
US 2013/0075504 A1    Mar. 28, 2013

(30) Foreign Application Priority Data
Sep. 26, 2011   (FR) ...................................... 11 58555

(51) Int. Cl.
*B02C 19/22*    (2006.01)

(52) U.S. Cl.
USPC ........................................ 241/30; 241/260.1

(58) Field of Classification Search
USPC ........................................ 241/30, 260.1, 261
See application file for complete search history.

(56) References Cited

U.S. PATENT DOCUMENTS

| | | | |
|---|---|---|---|
| 5,087,400 | A | 2/1992 | Theuveny |
| 5,413,618 | A | 5/1995 | Penningsfeld et al. |

FOREIGN PATENT DOCUMENTS

| | | |
|---|---|---|
| EP | 0070782 | 1/1983 |
| EP | 0 324 689 | 7/1989 |
| EP | 0 472 684 | 11/1993 |
| FR | 2248780 | 5/1975 |

*Primary Examiner* — Mark Rosenbaum
(74) *Attorney, Agent, or Firm* — Hamre, Schumann, Mueller & Larson, P.C.

(57) ABSTRACT

Wood chips are fed into a sheath containing two parallel screws that mesh with each other, their respective threads having, at least an upstream series of segments and a downstream series of segments, each of which comprises a drive upstream zone in which the chips are driven downstream and a braking downstream zone through which the chips are forced, the chips thus being driven through the sheath while being braked in the braking zones and while being transformed into fibers. The transit time for which the chips remain in the sheath lies in the range 1.5 s to 80 s, and provision is made for the pressure to be at least substantially equal to 90 bars upstream from the braking zone of the upstream series, so that a temperature lying in the range 120° to 150° C. is reached inside the sheath (10) without supplying external heat.

8 Claims, 2 Drawing Sheets

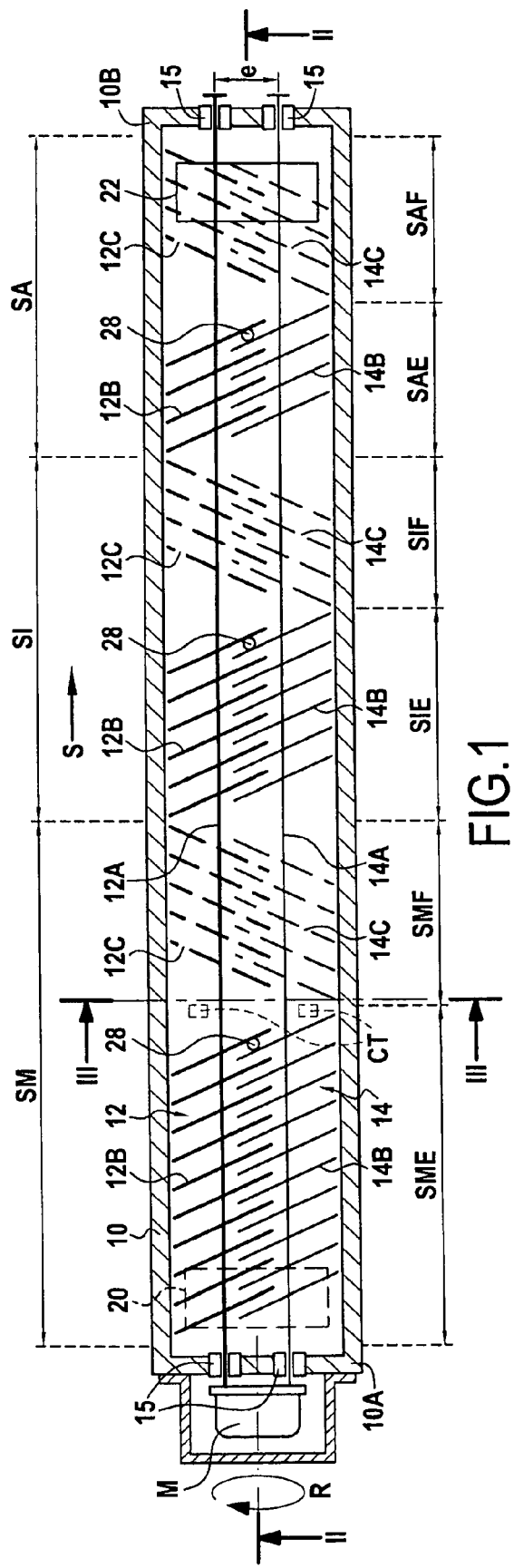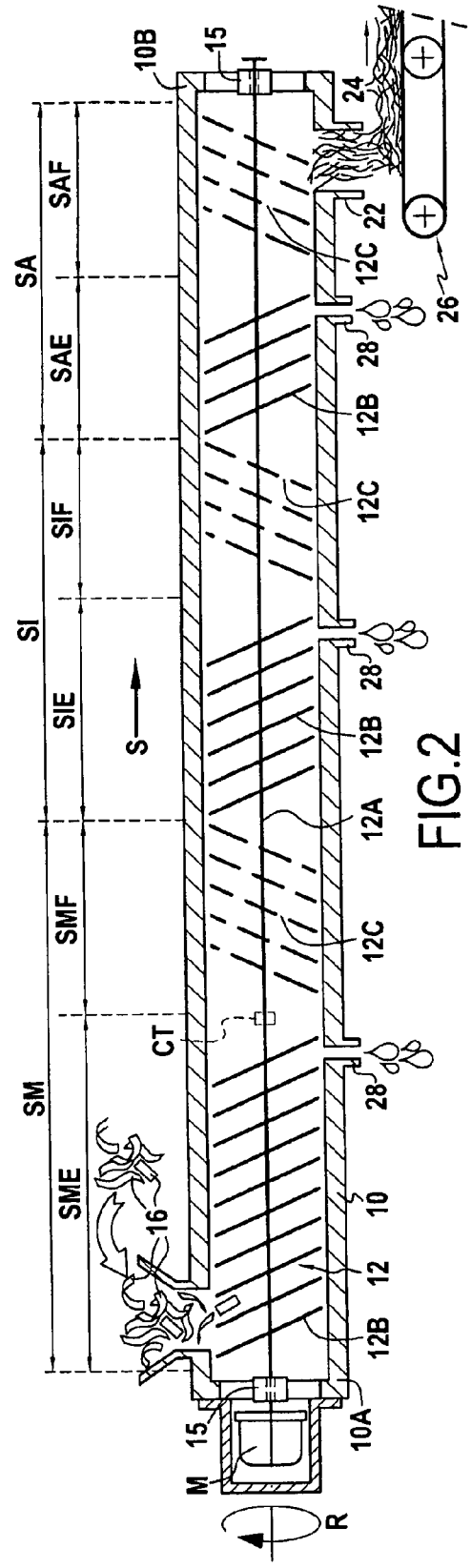

METHOD OF PREPARING WOOD FIBERS FOR A CULTIVATION SUBSTRATE

The opening in the wall of the sheath that is formed at the feed 20 is advantageously symmetrical about the vertical midplane between the axes 12A and 14A of the screws so as to guarantee good distribution of the chips onto the two screws as soon as said chips enter the sheath. Similarly, the opening formed at the outlet 22 of the sheath is advantageously symmetrical about the same vertical midplane.

FIELD OF THE INVENTION

The present invention relates to a method of preparing wood fibers for use in the composition of a cultivation substrate, in which method wood chips are fed into a defibration sheath containing two parallel screws driven in rotation in such a manner as to mesh with each other via their respective threads, said threads having, in succession, in the direction going from upstream to downstream, at least an upstream series of segments and a downstream series of segments, each of which comprises a drive upstream zone in which the chips are driven downstream and a braking downstream zone through which the chips are forced under the drive effect procured by the upstream zone, the chips thus being driven through the sheath while being braked in the braking zones and while being transformed into fibers that are recovered at the outlet of the defibration sheath.

BACKGROUND OF THE INVENTION

It is known to be advantageous to use wood fibers in the composition of a cultivation substrate.

For example, French Patent FR 2 248 780 filed in 1974, discloses cultivation media made from wood fibers, without addressing in any detail the method of obtaining such fibers.

European Patent EP 0 472 684 discloses a method and an installation for manufacturing a peat-substitute cultivation substrate, and recommends breaking up a fibrous organic material such as wood chips, mixing additional substances with it, and reducing the mixture to fibers and grinding it in a grinder having two contra-rotating parallel screws, with temperature control requiring heating or cooling. The resulting material is not homogeneous and must be sieved so as to recirculate any lumps that are too large into the inlet of the grinder. That document recommends heating the fibers to temperatures lying in the range 60° C. to 120° C. with a view to sterilizing and drying them.

European Patent EP 0 324 689 also discloses a method and an installation for manufacturing a cultivation substrate from wood fibers. In order to obtain those fibers, that document recommends using a machine having two parallel screws turning in the same direction and meshing with each other. Those two screws are provided with threads that are successively forward and reverse threads so as to determine a succession of drive zones and of compression zones, the reverse threads being provided with windows through which the material passes. An adhesive binder for clumping the fibers is fed in during the defibration. In that method, the time taken for the material to pass through the machine is very short, and of the order of a few seconds. In order to guarantee that the temperature necessary for sterilizing the fibers is obtained, the machine is provided with heater jackets upstream from the zone at which the adhesive binder is fed in. In addition, insofar as the adhesive binder is a thermosetting binder, the machine is also provided with cooling jackets in the region in which said binder is fed in, so as to prevent it from setting. Thus, that machine is relatively complex and has relatively high energy consumption.

OBJECT AND SUMMARY OF THE INVENTION

An object of the invention is to propose a method of preparing wood fibers for use in the composition of a cultivation substrate, which method is substantially exempt from the above-mentioned drawbacks.

This object is achieved by the fact that the transit time for which the chips remain in the sheath lies in the range 15 seconds(s) to 80 s and that provision is made for the pressure to be at least substantially equal to 90 bars upstream from the braking downstream zone of the upstream series, so that a temperature lying in the range 120° to 150° C. is reached inside the sheath without supplying external heat.

After many tests, the Applicant has observed that this combination of transit time and of pressure makes it possible, without supplying external heat, to obtain the temperature range necessary for sterilizing or decontaminating the fibers, while also preventing the temperature from becoming excessive, which would burn the fibers. The Applicant has observed that a temperature higher than 150° C. tends to bake the wood in a manner tantamount to beginning thermotransformation or to thermostabilization, adversely affecting its qualities as a cultivation substrate, in particular by reducing its capacity to absorb and retain water. As explained below, this pressure of approximately at least 90 bars can be obtained in particular by taking account of the lengths of the parallel screws and of their drive and braking zones, their speed of rotation, and the loading of the sheath with wood chips. It is the sum of the static and dynamic pressures in the sheath. The maximum pressure is reached upstream from the first braking zone, i.e. immediately upstream from the braking downstream zone of the upstream series, at the interface between the drive upstream zone of said series and said braking downstream zone. In the portion of the sheath that is situated downstream from this place, the pressure falls to close to atmospheric pressure. After the very high compression, this reduction in pressure makes it possible to inject additives.

In addition, the transit time of approximately in the range 15 s to 80 s makes it possible to subject the fibers to a temperature of in the range 120° C. to 150° C. for a lapse of time that is long enough to decontaminate the fibers of harmful micro-organisms.

Advantageously, provision is made for the pressure to be in the range 90 bars to 130 bars upstream from the braking downstream zone of the upstream series.

The pressure can be maintained within this range by acting on the feed rate at which the sheath is fed with wood chips to be defibrated. The tests conducted by the Applicant have led the Applicant to observe that, so long as the pressure remains within this range, the temperature can remain within the range 120° C. to 150° C. without supplying external heat and without cooling.

Advantageously, the transit time for which the chips remain in the sheath lies in the range 25 s to 60 s.

Although it is relatively short in order to enable a high production throughput rate to be achieved, this time is long enough to make it possible, under the above-mentioned pressure conditions, to obtain the temperature necessary for decontaminating the fibers.

Advantageously, the screws are caused to turn at a speed lying in the range 250 revolutions per minute (rpm) to 400 rpm, and preferably in the range 300 rpm to 380 rpm.

This speed of rotation is quite high in order to ensure that the chips are defibrated effectively. The length of the screws and the loading of the sheath with wood chips can then be determined to achieve the desired transit time for which the fibers stay in the sheath. For example, screws are chosen that are of length lying in the range 1600 millimeters (mm) to 3000 mm.

If the length of the screws exceeds 2000 mm or 2300 mm, it is advantageous to make provision for them to have an intermediate series in addition to the upstream and downstream series of segments, which intermediate series also has a drive upstream zone and a braking downstream zone.

Advantageously, in the drive upstream zones, the chips are put into contact with forward threads, whereas, in the braking downstream zones, the chips are put into contact with reverse threads.

This is a simple manner of forming the drive upstream zones and the braking downstream zones.

Advantageously, in the braking downstream zones, the chips are caused to pass through notches provided in the threads.

In which case, in the braking downstream zones, each reverse thread of the braking, downstream zone of the downstream series advantageously has in the range 2 notches to 6 notches, the section-to-output ratio $R_{so}$ of the sum of the sections of the notches of such a thread to the fiber output rate lying in the range 60 square millimeters per cubic meter per hour ($mm^2/m^3h^{-1}$) to 80 $mm^2/m^3h^{-1}$ and preferably lying in the range 70 $mm^2/m^3h^{-1}$ to 75 $mm^2/m^3h^{-1}$.

Thus, since the notches are determined as indicated above, the feeding of the sheath with chips that determines the loading of the sheath with chips is performed such that the ratio of the sum of the sections of the notches of a thread to the fiber output rate lies within the above-indicated range. Under these conditions, a pressure of at least 90 bars is obtained simply, without requiring a complex sheath structure. The fiber output rate is determined, in compliance with French Standard NF EN 12580, by measuring the volume of fibers collected at the outlet of the sheath, expressed in cubic meters ($m^3$), in one hour.

BRIEF DESCRIPTION OF THE DRAWINGS

The invention can be well understood and its advantages appear more clearly from the following detailed description of an embodiment described by way of non-limiting example.

The description refers to the accompanying drawings, in which:

FIG. 1 is a diagrammatic plan view of a defibration installation making it possible to implement the method of the invention, with the wall of the sheath being cut-away;

FIG. 2 is a diagrammatic view corresponding to a view of the FIG. 1 installation in section on plane II-II of FIG. 1, with the portions of the screw 14 that are present in this plane being omitted;

MORE DETAILED DESCRIPTION

The installation shown in the figures comprises a sheath 10 in which two screws 12, 14 are disposed that mesh with each other. The distance e between the axes of the two screws is less than the outside diameter of their threads. The shafts 12A and 14A of the screws 12 and 14 are driven in rotation by a motor M and are supported in rotation by bearings, such as the bearings 15.

Figure 3:
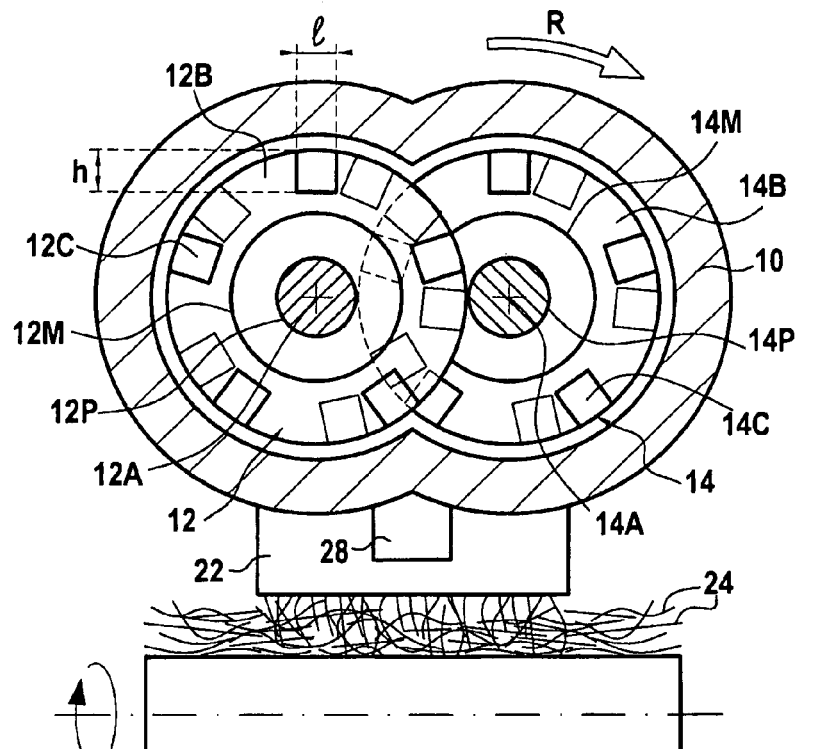
FIG. 3 is a view in section on line III-III of FIG. 1.

As can be seen more clearly in FIG. 3, the outside wall of the sheath has the shape of two intersecting cylinder segments, each of which is adapted to match the diameter of the screws 12 and 14. Preferably over its entire length, the sheath has an opening cover that forms one of its longitudinal walls and serves to enable maintenance and jam-clearing to be performed on it, if necessary.

The chips or shavings 16 that are to be defibrated, i.e. reduced to fibers, are loaded into the sheath via a feed 20 situated at the upstream end 10A of the sheath and, for example, being in the form of a hopper situated on the top face of the sheath, into which the chips are brought by any suitable means, e.g. by a screw conveyor (not shown).

At its downstream end 10B, the sheath has an outlet 22. For example, the outlet is constituted by a chute situated on the bottom face of the sheath and allowing the fibers 24 to fall by gravity onto the belt conveyor 26. The conveyor may be equipped with a tunnel (not shown), ventilated with a gas, such as air (preferably filtered air), so as to cool the fibers progressively as they are being conveyed.

The opening in the wall of the sheath that is formed at the feed 20 is advantageously symmetrical about the vertical midplane between the axes 12A and 12B of the screws so as to guarantee good distribution of the chips onto the two screws as soon as said chips enter the sheath. Similarly, the opening formed at the outlet 22 of the sheath is advantageously symmetrical about the same vertical midplane.

Due to the rotation of the screws, the chips are driven in the direction S going from upstream to downstream.

One or more extraction filters 28 are disposed in the bottom wall of the sheath, which filters serve to extract the liquor coming from the defibration or the water for washing the chips, thereby making it possible to regulate the final humidity of the product. For example, said filters are placed at the upstream ends of the braking zones that are described below.

The two screws 12 and 14 turn in the same direction R and at the same speed of rotation. Over each segment of the facing screws, the threads of the two screws are of the same direction.

For each screw, the threads have an upstream series SM of segments and a downstream series of segments SA. In this example, the threads also have an intermediate series SI situated between the upstream series SM and the downstream series SA. Thus, the series SM, SI, and SA are disposed in succession along the sheath from upstream to downstream.

Each of the series itself comprises a drive upstream zone, respectively SME, SIE, and SAE for the upstream, intermediate, and downstream segments, and a braking downstream zone, respectively SMF, SIP, and SAF for the upstream, intermediate and downstream series. These drive zones and braking zones are respectively referred to as "upstream" and as "downstream" because, for each series, the drive zone is upstream from the braking zone in the direction S in which the chips advance during defibration.

It can be seen that, in the drive zones SME, SIE, and SAE, the threads 12B and 14B of the screws 12 and 14 are forward threads. This means that, by turning the screw in the direction R, these threads cause the material that is situated between them to advance downstream naturally. Conversely, in the braking zones SMF, SIF, and SAF, the threads 12B and 14B are reverse threads, i.e. turning the screw in the direction R tends to cause the material situated between them to move back upstream.

As a result, for each series, the material being defibrated tends to clump together at the interface between the drive zone and the braking zone. In order to enable the material to be conveyed, nevertheless, downstream through each braking zone, the threads of the braking zones have interruptions or notches 12C, 14C. Thus, these notches form constriction zones through which the material is forced to pass, under the effect of the thrust exerted, upstream, by the material driven downstream by the drive upstream zone.

The notches can be seen more clearly in FIG. 3 which is a view in vertical section immediately upstream from a braking zone (in this example, the braking zone of the upstream series SM), and shows how a braking zone is organized. In this example, for the braking zone of each of the two screws 12 and 14, each thread has 5 identical notches, respectively 12C and 14C, that are uniformly angularly distributed.

The axes of the screws are referenced 12A and 14A, which are the axes of rotation of their carrier shafts, respectively 12P and 14P. Since the screw segments can advantageously be disassembled, their threads are carried by sleeves, respectively 12M and 14M, which are mounted on the carrier shafts and are constrained in rotation therewith by any suitable means, e.g. by axial fluting (not shown).

For each thread, the notches are defined radially between the radially outer periphery of the thread and its radially inner periphery defined by the outside surface of the sleeve, respectively 12M and 14M. For example, the outside diameter of each screw, defined by the radially outer periphery of its thread, is 240 mm, the radial height h of a notch is 44 mm and the width of a notch is 16 mm. For a thread, i.e. by following a thread of the screw through an angle of 360°, a sum of the sections of the notches of the thread is obtained that is as follows: 5×44×16=3520 square millimeters (mm²).

Advantageously, in a braking zone of the screw 12 or 14, the notches 12C or 14C of two consecutive threads of the same screw are angularly offset to a small extent. In order to illustrate this characteristic, in FIG. 3 thick lines are used to show the notches in the threads that are situated firstly starting from the section plane, while thin lines are used to show the positions of the notches in the threads that are situated immediately downstream from the first threads. In this example, the angular offset is approximately in the range 10° to 20°, and it is directed in the direction of rotation R of the screws, so that a line interconnecting two corresponding notches of two adjacent threads is directed in the same direction as the forward threads.

The installation is fed continuously and the feed flow-rate is adjusted to satisfy the above-mentioned pressure and temperature parameters.

Thus, the installation advantageously includes at least one temperature sensor CT situated upstream from the downstream braking zone SMF of the upstream series (in the region of the section plane III-III). A correspondence table giving correspondences between temperature and pressure may be established. Thus, a rise in temperature revealed by the temperature sensor CT can indicate too high a risk of an increase in pressure. The installation can then be regulated by reducing the wood chip feed flow-rate. It is also possible to make provision for the pressure to be measured directly by means of a pressure sensor CP situated in the same region as the temperature sensor CT. The measurements made by these sensors (at least the measurement made by the temperature sensor CT) may be input into a microprocessor that delivers a command to the wood chip feed system, e.g. an endless screw, as indicated above. If no direct pressure measurement is available, the microprocessor may, in a memory, have a temperature/pressure correspondence table. If the pressure is measured directly, the microprocessor can control the wood chip feed system on the basis of the two items of data (temperature and pressure) that are delivered to it. For a determined species of wood and for a known humidity, it is possible to establish a relationship between the pressure & temperature parameters and the electrical power consumed by the motor that drives the screws in rotation (or the electrical current delivered, if the voltage is constant, as it often is). This relationship can be determined empirically by testing. With this relationship being known, it is possible to obtain the desired pressure and temperature parameters by adjusting the wood chip feed in such a manner as to consume a target amount of power.

Examples are given below of installations having two parallel screws mounted to turn in the same direction and at the same speed and that are suitable for implementing the method of the invention.

EXAMPLE 1

Machine in Which the Screws Have Three Series of Segments

Length of screws (inside length of the sheath): 2620 mm
Diameter of the screws: 240 mm
Pitch of the forward threads: 110 mm
Pitch of the reverse threads: 60 mm
Speed of rotation of the screws: 330 rpm
Upstream Series (SM):
 number of forward threads (zone SME): 8
 number of reverse threads (zone SMF): 3
 number of notches per reverse thread (zone SMF): 5
 width of each notch: 22 mm
 depth of each, notch: 44 mm
 total section of the notches:

$$5\times22\times44=4840 \text{ mm}^2$$

Intermediate Series (SI):
 number of forward threads (zone SIE): 3
 number of reverse threads (zone SIF): 3
 number of notches per reverse thread (zone SIF): 5
 width of each notch: 18 mm
 depth of each notch: 44 mm
 total section of the notches:

$$5\times18\times44=3780 \text{ mm}^2$$

Downstream Series (SA):
 number of forward threads (zone SAE): 5
 number of reverse threads (zone SAF): 3
 number of notches per reverse thread (zone SAF): 5
 width of each notch: 16 mm
 depth of each notch: 44 mm
 total section of the notches:

$$5\times16\times44=3520 \text{ mm}^2$$

Transit time for which the material (chips transformed into fibers) remains in the sheath: 40 s
Fiber output rate: 50 cubic meters per hour (m³/h)
Section-to-Output ratio $R_{so}$: 3520/50=70.4 mm²/m³h⁻¹

EXAMPLE 2

Machine in Which the Screws Have Two Series of Segments

Length of screws (inside length of the sheath): 2340 mm
Diameter of the screws: 240 mm
Pitch of the forward threads: 110 mm Pitch of the reverse threads: 60 mm
Speed of rotation of the screws: 330 rpm
Upstream Series (SM):
  number of forward threads (zone SME): 7
  number of reverse threads (zone SMF): 3
  number of notches per reverse thread (zone SMF): 5
  width of each notch: 18 mm
  depth of each notch: 40 mm
  total section of the notches:

$5 \times 18 \times 40 = 3600$ mm$^2$

Downstream Series (SA):
  number of forward threads (zone SAE): 5
  number of reverse threads (zone SAF): 3
  number of notches per reverse thread (zone SAF): 5
  width of each notch: 14 mm
  depth of each notch: 40 mm
  total section of the notches:

$5 \times 16 \times 40 = 2800$ mm$^2$

Transit time for which the material (chips transformed into fibers) remains in the sheath: 35 s
Fiber output rate: 38 m$^3$/h
Section-to-Output ratio $R_{so}$: 2800/38 = 73.7 mm$^2$/m$^3$h$^{-1}$

EXAMPLE 3

Machine in Which the Screws Have Two Series of Segments

Length of screws (inside length of the sheath): 1935 mm
Diameter of the screws: 240 mm
Pitch of the forward threads: 110 mm
Pitch of the reverse threads: 60 mm
Speed of rotation of the screws: 330 rpm
Upstream Series (SM):
  number of forward threads (zone SME): 10
  number of reverse threads (zone SMF): 3
  number of notches per reverse thread (zone SMF): 5
  width of each notch: 14 mm
  depth of each notch: 40 mm
  total section of the notches:

$5 \times 14 \times 40 = 2800$ mm$^2$

Downstream Series (SA):
  number of forward threads (zone SAE): 3
  number of reverse threads (zone SAF): 3
  number of notches per reverse thread (zone SAF): 5
  width of each notch: 12 mm.
  depth of each notch: 40 mm
  total section of the notches:

$5 \times 12 \times 40 = 2400$ mm$^2$

Transit time for which the material (chips transformed into fibers) remains in the sheath: 30 s
Fiber output rate: 33 m$^3$/h
Section-to-Output ratio $R_{so}$: 2400/33 = 72.7 mm$^2$/m$^3$h$^{-1}$

EXAMPLE 4

Machine in Which the Screws Have Two Series of Segments

Length of the screws (inside length of the sheath): 1600 mm
Diameter of the screws: 102 mm
Pitch of the threads: 50 mm
Speed of rotation of the screws: 33 0 rpm
Upstream Series (SM):
  number of forward threads (zone SME): 14
  number of reverse threads (zone SMF): 2
  number of notches per reverse thread (zone SMF): 3
  width of each notch: 18 mm
  depth of each notch: 21 mm
  total section of the notches:

$3 \times 18 \times 21 = 1134$ mm$^2$

Downstream Series (SA):
  number of forward threads, (zone SAE): 5
  number of reverse threads (zone SAF): 2
  number of notches per reverse thread, (zone SAF): 3
  width of each notch: 14 mm
  depth of each notch: 21 mm
  total section of the notches: $3 \times 14 \times 21 = 882$ mm$^2$
Transit time for which the material (chips transformed into fibers) remains in the sheath: 30 s
Fiber output rate: 12 m$^3$/h
Section-to-Output ratio $R_{so}$: 882/12 = 73.5 mm$^2$/m$^3$h$^{-1}$ The Applicant has observed that the transit time/pressure/temperature parameters are optimized if the chip feed of the machine is managed in such a manner as to obtain a fiber output rate such that, knowing the total section of the notches of each thread in the downstream series SA, the ratio $R_{so}$ remains within the range 60 mm$^2$/m$^3$h$^{-1}$ to 80 mm$^2$/m$^3$h$^{-1}$, and preferably within the range 70 mm$^2$/m$^3$h$^{-1}$ to 75 mm$^2$/m$^3$h$^{-1}$.

Naturally, the adjustments of the installation and of the method may be fine tuned as a function of the species of wood or of the mix of species of wood of the chips that are defibrated. The examples indicated above are given by way of illustrative but non-limiting indication.

Figure 4:
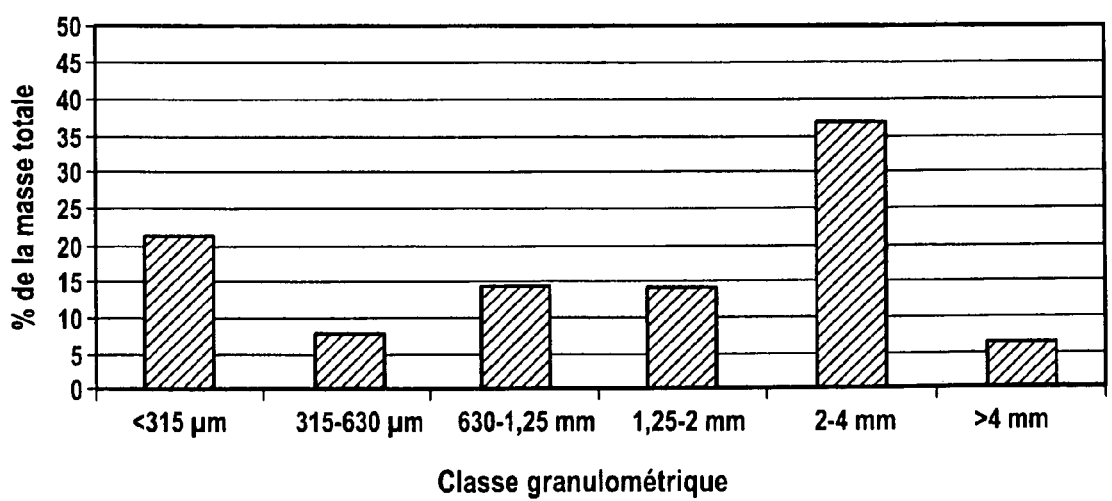
FIG. 4 is a graph showing the particle-size distribution for the resulting fibers.

With maritime pine, and using the machine of example 1 above, the particle-size distribution of the fibers obtained at the outlet of the installation is as indicated in FIG. 4.

An installation is described above that has two parallel screws turning in the same direction and at the same speed in the sheath. It is possible to use a different number of parallel screws, e.g. four such screws.

What is claimed is:

1. A method of preparing wood fibers for use in the composition of a cultivation substrate, wherein wood chips are fed into a defibration sheath containing two parallel screws driven in rotation in such a manner as to mesh with each other via their respective threads, said threads having, in succession, in the direction going from upstream to downstream, at least an upstream series of segments and a downstream series of segments, each of which comprises a drive upstream zone in which the chips are driven downstream and a braking downstream zone through which the chips are forced under the drive effect procured by the upstream zone, the chips thus being driven through the sheath while being braked in the braking zones and while being transformed into fibers that are recovered at the outlet of the defibration sheath, the transit time for which the chips remain in the sheath lying in the range 15 s to 80 s, and provision is made for the pressure to be at least substantially equal to 90 bars upstream from the braking downstream zone of the upstream series, so that a temperature lying in the range 120° to 150° C. is reached inside the sheath without supplying external heat.

2. A method according to claim 1, wherein the transit time for which the chips remain in the sheath lies in the range 25 s to 60 s.

3. A method according to claim 1, wherein the screws are caused to turn at a speed lying in the range 250 rpm to 400 rpm.

4. A method according to claim 1, wherein the screws are caused to turn at a speed lying in the range 300 rpm to 380 rpm.

5. A method according to claim 4, wherein, in the braking downstream zones, each reverse thread of the braking downstream zone of the downstream series has in the range 2 notches to 6 notches, the ratio of the sum of the sections of the notches of such a thread to the fiber output rate lying in the range 60 mm$^2$/m$^3$h$^{-1}$ to 80 mm$^2$/m$^3$h$^{-1}$.

6. A method according to claim 4, wherein, in the braking downstream zones, each reverse thread of the braking downstream zone of the downstream series has in the range 2 notches to 6 notches, the ratio of the sum of the sections of the notches of such a thread to the fiber output rate lying in the range 70 mm$^2$/m$^3$h$^{-1}$ to 75 mm$^2$/m$^3$h$^{-1}$.

7. A method according to claim 1, wherein, in the drive upstream zones, the chips are put into contact with forward threads, whereas, in the braking downstream zones, the chips are put into contact with reverse threads.

8. A method according to claim 1, wherein, in the braking downstream zones, the chips are caused to pass through notches provided in the threads.

\* \* \* \* \*